US010266681B2

(12) United States Patent
Fukumine

(10) Patent No.: US 10,266,681 B2
(45) Date of Patent: Apr. 23, 2019

(54) CROSS-LINKABLE NITRILE RUBBER COMPOSITION AND CROSS-LINKED RUBBER PRODUCT, AND METHOD FOR MANUFACTURING CROSS-LINKABLE NITRILE RUBBER COMPOSITION

(71) Applicant: ZEON CORPORATION, Tokyo (JP)

(72) Inventor: Yoshio Fukumine, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/535,921

(22) PCT Filed: Nov. 30, 2015

(86) PCT No.: PCT/JP2015/083549
§ 371 (c)(1),
(2) Date: Jun. 14, 2017

(87) PCT Pub. No.: WO2016/104056
PCT Pub. Date: Jun. 30, 2016

(65) Prior Publication Data
US 2017/0342241 A1    Nov. 30, 2017

(30) Foreign Application Priority Data
Dec. 25, 2014    (JP) .................................. 2014-262867

(51) Int. Cl.
| | | |
|---|---|---|
| *C08L 15/00* | (2006.01) | |
| *C08L 67/00* | (2006.01) | |
| *C08L 77/00* | (2006.01) | |
| *C08L 9/02* | (2006.01) | |
| *C08K 5/17* | (2006.01) | |
| *C08L 13/00* | (2006.01) | |
| *C08L 101/00* | (2006.01) | |
| *C08L 33/20* | (2006.01) | |

(52) U.S. Cl.
CPC ........ *C08L 9/02* (2013.01); *C08K 5/17* (2013.01); *C08L 13/00* (2013.01); *C08L 15/005* (2013.01); *C08L 33/20* (2013.01); *C08L 101/00* (2013.01); *C08L 2312/00* (2013.01)

(58) Field of Classification Search
None
See application file for complete search history.

(56) References Cited

U.S. PATENT DOCUMENTS

| | | |
|---|---|---|
| 6,657,014 B1 | 12/2003 | Mori et al. |
| 2003/0134979 A1* | 7/2003 | Ferrari ............... C08L 13/00 525/178 |
| 2010/0029857 A1 | 2/2010 | Soddemann et al. |
| 2010/0168302 A1 | 7/2010 | Nagamori et al. |
| 2012/0172509 A1 | 7/2012 | Nagamori et al. |
| 2013/0102725 A1 | 4/2013 | Nagamori et al. |
| 2013/0280459 A1 | 10/2013 | Nakashima et al. |
| 2014/0065336 A1 | 3/2014 | Nakashima et al. |
| 2014/0296404 A1 | 10/2014 | Nagamori et al. |

FOREIGN PATENT DOCUMENTS

| | | |
|---|---|---|
| EP | 1234851 A1 | 8/2002 |
| EP | 1964882 A1 | 9/2008 |
| EP | 2145920 A1 | 1/2010 |
| EP | 2660285 A1 | 11/2013 |
| EP | 2692788 A1 | 2/2014 |
| JP | 2011-213842 A | 10/2011 |
| JP | 2013-018936 A | 1/2013 |
| JP | 2014-118549 A | 6/2014 |
| JP | 2015-030750 A | 2/2015 |
| JP | 2015-063634 A | 4/2015 |
| WO | 98/44039 A1 | 10/1998 |
| WO | 2005042624 A1 | 5/2005 |
| WO | 2012/133618 A1 | 10/2012 |

OTHER PUBLICATIONS

Jun. 27, 2017 International Preliminary Report on Patentability issued in International Patent Application No. PCT/JP2015/083549.
Feb. 9, 2016 Search Report issued in International Patent Application No. PCT/JP2015/083549.
Sep. 18, 2018 extended European Search Report issued in Application No. 15872625.7.

* cited by examiner

*Primary Examiner* — Ana L. Woodward
(74) *Attorney, Agent, or Firm* — Oliff PLC

(57) ABSTRACT

A cross-linkable nitrile rubber composition contains a carboxyl group-containing highly saturated nitrile rubber, a resin, and a polyamine cross-linking agent. The content of the carboxyl group-containing highly saturated nitrile rubber is 30 parts by weight or more with respect to 100 parts by weight of the total amount of the carboxyl group-containing highly saturated nitrile rubber and the resin. The cross-linkable nitrile rubber composition is obtained by performing kneading at a temperature equal to or higher than the melting point of the resin.

7 Claims, No Drawings

CROSS-LINKABLE NITRILE RUBBER COMPOSITION AND CROSS-LINKED RUBBER PRODUCT, AND METHOD FOR MANUFACTURING CROSS-LINKABLE NITRILE RUBBER COMPOSITION

TECHNICAL FIELD

The present invention relates to a cross-linkable nitrile rubber composition capable of providing a cross-linked rubber product having excellent compression set resistance and having excellent original state properties, heat aging resistance, and fuel oil resistance, and a cross-linked rubber product obtained by using the cross-linkable nitrile rubber composition.

BACKGROUND ART

Conventionally, a nitrile rubber (acrylonitrile-butadiene copolymer rubber) has been used as a material for an automotive rubber part such as a hose or a tube by taking advantage of fuel oil resistance, a mechanical characteristic, chemical resistance, and the like. In addition, a hydrogenated nitrile rubber (highly saturated nitrile rubber) obtained by hydrogenating a carbon-carbon double bond in a polymer main chain of a nitrile rubber has better heat resistance, and has been used for a rubber part such as a hose, a sealing material, a gasket, or a diaphragm.

Recently, characteristics required for an automotive rubber part have become severe. Particularly, a rubber part used for a sealing material needs to have excellent original state properties (tensile strength, elongation, and tensile stress), heat aging resistance, fuel oil resistance, compression set resistance, and the like.

For such a situation, a rubber composition obtained by using a carboxyl group-containing highly saturated nitrile rubber containing 1 to 60% by weight of α,β-ethylenically unsaturated dicarboxylic acid monoester monomer units and a highly saturated nitrile rubber containing 0.9% by weight or less of α,β-ethylenically unsaturated dicarboxylic acid monoester monomer units at a specific ratio, and blending a polyamide resin thereto has been proposed (Patent Literature 1). By using this rubber composition, a cross-linked rubber product having excellent roll processability in addition to excellent original state properties and fuel oil resistance can be obtained. However, for example, in a cross-linked rubber product carrying a space like an O-ring, compression set tends to be increased due to a force applied during compression. Therefore, further improvement in compression set resistance has been desired.

CITATION LIST

Patent Literature

Patent Literature 1: WO 2012/133618 A

SUMMARY OF INVENTION

Technical Problem

An object of the present invention is to provide a cross-linkable nitrile rubber composition capable of providing a cross-linked rubber product having excellent compression set resistance and having excellent original state properties, heat aging resistance, and fuel oil resistance, and a cross-linked rubber product obtained by using the cross-linkable nitrile rubber composition.

Solution to Problem

The present inventor made intensive studies in order to achieve the above object. As a result, the present inventor has found that a cross-linkable nitrile rubber composition obtained by blending a carboxyl group-containing highly saturated nitrile rubber (A) in a predetermined amount or mote, a resin (B), and a polyamine cross-linking agent (C), and kneading these compounds at a temperature higher than the melting point of the resin (B) can be achieve the above object, and has completed the present invention.

That is, the present invention provides:

(1) a cross-linkable nitrile rubber composition containing a carboxyl group-containing highly saturated nitrile rubber (A), (B), and a polyamine cross-linking agent (C), in which a content of the carboxyl group-containing highly saturated nitrile rubber (A) is 30 parts by weight or more with respect to 100 parts by weight of a total amount of the carboxyl group-containing highly saturated nitrile rubber (A) and the resin (B), and the cross-linkable nitrile rubber composition is obtained by performing kneading at a temperature equal to or higher than a melting point of the resin (B); and (2) a cross-linked rubber product obtained by cross-linking the cross-linkable nitrile rubber composition described in (1).

Advantageous Effects of Invention

The cross-linkable nitrile rubber composition of the present invention can provide a cross-linked rubber product having excellent compression set resistance and having excellent original state properties, heat aging resistance, and fuel oil resistance. In addition, a cross-linked rubber product obtained by using the cross-linkable nitrile rubber composition can be provided.

DESCRIPTION OF EMBODIMENTS

Hereinafter, a cross-linkable nitrile rubber composition of the present invention will be described. The cross-linkable nitrile rubber composition of the present invention is a cross-linkable nitrile rubber composition containing a carboxyl group-containing highly saturated nitrile rubber (A), a resin (B), and a polyamine cross-linking agent (C). The content of the carboxyl group-containing highly saturated nitrile rubber (A) is 30 parts by weight or more with respect to 100 parts by weight of the total amount of the carboxyl group-containing highly saturated nitrile rubber (A) and the resin (B). The cross-linkable nitrile rubber composition is obtained by kneading these compounds at a temperature equal to or higher than the melting point of the resin (B).

In addition, the cross-linkable nitrile rubber composition of the present invention is preferably obtained by preparing a highly saturated nitrile rubber composition by kneading the carboxyl group-containing highly saturated nitrile rubber (A) and the resin (B) at a temperature equal to or higher than the melting point of the resin (B), and then adding the polyamine cross-linking agent (C) to this highly saturated nitrile rubber composition.

Carboxyl Group-Containing Highly Saturated Nitrile Rubber (A)

The carboxyl group-containing highly saturated nitrile rubber (A) used in the present invention is obtained by copolymerizing an α,β-ethylenically unsaturated nitrile monomer, an α,β-ethylenically unsaturated dicarboxylic acid monoester monomer, and another copolymerizble monomer added as necessary.

Here, the carboxyl group-containing highly saturated nitrile rubber (A) used in the present invention is a rubber containing 15 to 60% by weight of α,β-ethylenically unsaturated nitrile monomer units and 1 to 60% by weight of α,β-ethylenically unsaturated dicarboxylic acid monoester monomer units, and having an iodine value of 120 or less.

The α,β-ethylenically unsaturated nitrile monomer is not particularly limited as long as being an α,β-ethylenically unsaturated compound having a nitrile group. Examples thereof include acrylonitrile; an α-halogeno acrylonitrile such as α-chloro acrylonitrile or α-bromo acrylonitrile; and an α-alkyl acrylonitrile such as methacrylonitrile. Among these compounds, acrylonitrile and methacrylonitrile are preferable, and acrylonitrile is more preferable. The α,β-ethylenically unsaturated nitrile monomer may be used singly or in combination of a plurality of kinds thereof.

The content of the α,β-ethylenically unsaturated nitrile monomer unit 15 to 60% by weight, preferably from 18 to 55% by weight, and more preferably from 20 to 50% by weight with respect to the total monomer units constituting the carboxyl group-containing highly saturated nitrile rubber (A). When the content of the α,β-ethylenically unsaturated nitrile monomer unit is equal to or more than the lower limit value of the above range, a phenomenon that the fuel oil resistance of an obtained cross-linked rubber product is lowered excessively can be suppressed. On the contrary, when the content is equal to or less than the upper limit value of the above range, a phenomenon that the cold resistance is lowered excessively can be suppressed.

Examples of the α,β-ethylenically unsaturated dicarboxylic acid monoester monomer include a mono-alkyl maleate such as mono-methyl maleate, mono-ethyl maleate, mono-propyl maleate, or mono-n-butyl maleate; a mono-cycloalkyl maleate such as mono-cyclopentyl maleate, mono-cyclohexyl maleate, or mono-cycloheptyl maleate; a mono-alkyl cycloalkyl maleate such as mono-methyl cyclopentyl maleate or mono-ethyl cyclohexyl maleate; a mono-alkyl fumarate such as mono-methyl fumarate, mono-ethyl fumarate, mono-propyl fumarate, or mono-n-butyl fumarate; a mono-cycloalkyl fumarate such as mono-cyclopentyl fumarate, mono-cyclohexyl fumarate, or mono-cycloheptyl fumarate; a mono-alkyl cycloalkyl fumarate such as mono-methyl cyclopentyl fumarate or mono-ethyl cyclohexyl fumarate; a mono-alkyl citraconate such as mono-methyl citraconate, mono-ethyl citraconate, mono-propyl citraconate, or mono-n-butyl citraconate; a mono-cycloalkyl citraconate such as mono-cyclopentyl citraconate, mono-cyclohexyl citraconate, or mono-cycloheptyl citraconate; a mono-alkyl cycloalkyl citraconate such as mono-methyl cyclopentyl citraconate or mono-ethyl cyclohexyl citraconate; a mono-alkyl itaconate such as mono-methyl itaconate, mono-ethyl itaconate, mono-propyl itaconate, or mono-n-butyl itaconate; a mono-cycloalkyl itaconate such as mono-cyclopentyl itaconate, mono-cyclohexyl itaconate, or mono-cycloheptyl itaconate; and a mono-alkyl cycloalkyl itaconate such as mono-methyl cyclopentyl itaconate or mono-ethyl cyclohexyl itaconate. Among these compounds, a mono-alkyl maleate is preferable, a mono-alkyl maleate in which the carbon number of the alkyl group is from 2 to 6 is more preferable, and mono-n-butyl maleate is particularly preferable. The α,β-ethylenically unsaturated dicarboxylic acid monoester monomer may be used singly or in combination of a plurality of kinds thereof.

The content of the α,β-ethylenically unsaturated dicarboxylic acid monoester monomer unit is from 1 to 60% by weight, preferably from 2 to 20% by weight, and more preferably from 2 to 10% by weight with respect to the total monomer units constituting the carboxyl group-containing highly saturated nitrile rubber (A). When the content of the α,β-ethylenically unsaturated dicarboxylic acid monoester monomer unit is equal to or more than the lower limit value of the above range, a phenomenon that the tensile strength and the elongation of an obtained cross-linked rubber product are deteriorated excessively can be suppressed. On the contrary, when the content is equal to or less than the upper limit value of the above range, a phenomenon that the heat resistance is deteriorated excessively can be suppressed.

In addition, the carboxyl group-containing highly saturated nitrile rubber (A) used in the present invent preferably contains a conjugated diene monomer unit in order to impart rubber elasticity to an obtained cross-linked rubber product.

As a conjugated diene monomer to form the conjugated diene monomer unit, a conjugated diene monomer having 4 to 6 carbon atoms, such as 1,3-butadiene, isoprene, 2,3-dimethyl-1,3-butadiene, 1,3-pentadiene, or chloroprene is preferable, 1,3-butadiene and isoprene are more preferable, and 1,3-butadiene is particularly preferable. The conjugated diene monomer may be used singly or in combination of a plurality of kinds thereof.

The content of the conjugated diene monomer unit (including a portion which has been saturated by hydrogenation or the like) is preferably from 25 to 84% by weight, more preferably from 25 to 80% by weight, and still more preferably from 40 to 78% by weight with respect to the total monomer units. When the content of the conjugated diene monomer unit is equal to or more than the lower limit value of the above range, a phenomenon that the rubber elasticity of an obtained cross-linked rubber product is lowered excessively can be suppressed. On the contrary, when the content is equal to or less than the upper limit value of the above range, a phenomenon that the heat resistance or chemical stability resistance is impaired excessively can be suppressed.

In addition, the carboxyl group-containing highly saturated nitrile rubber (A) used in the present invention may contain a product obtained by copolymerizing a carboxyl group-containing monomer other than the α,β-ethylenically unsaturated dicarboxylic acid monoester monomer within a range not impairing an effect of the present invention.

Examples of such a carboxyl group-containing monomer include an α,β-ethylenically unsaturated mono-carboxylic acid monomer such as acrylic acid, methacrylic acid, ethylacrylic acid, crotonic acid, or cinnamic acid; and an α,β-ethylenically unsaturated polycarboxylic acid monomer such as butenedionic acid (for example, fumaric acid or maleic acid), itaconic acid, citraconic acid, mesaconic acid, glutaconic acid, allylmalonic acid, or teraconic acid. In addition, an α,β-ethylenically unsaturated polycarboxylic acid anhydride such as maleic anhydride, itaconic anhydride, or citraconic anhydride can be also used as the carboxyl group-containing monomer.

The content of the carboxyl group-containing monomer unit other than the α,β-ethylenically unsaturated dicarboxylic acid monoester monomer is preferably 20% by weight or less, more preferably 10% by weight or less, and still more preferably 5% by weight or less with respect to the total monomer units constituting the carboxyl group-containing highly saturated nitrile rubber (A).

In addition, the carboxyl group-containing highly saturated nitrile rubber (A) used in the present invention may be obtained by copolymerizing an α,β-ethylenically unsaturated nitrile monomer, an α,β-ethylenically unsaturated dicarboxylic acid monoester monomer, a conjugated diene monomer, and a carboxyl group-containing monomer other than the α,β-ethylenically unsaturated dicarboxylic acid monoester monomer together with another monomer copolymerizable therewith. Examples of such another monomer include ethylene, an α-olefin monomer, an aromatic vinyl monomer, an α,β-ethylenically unsaturated carboxylic acid ester monomer (having no unesterified and unsubstituted (free) carboxyl group), a fluorine-containing vinyl monomer, and a copolymerizable anti-aging agent.

The α-olefin monomer preferably has 3 to 12 carbon atoms. Examples thereof include propylene, 1-butene, 4-methyl-1-pentene, 1-hexene, and 1-octene.

Examples of the aromatic vinyl monomer include styrene, α-methyl styrene, and vinyl pyridine.

Examples of the α,β-ethylenically unsaturated carboxylic acid ester monomer include a (meth)acrylate (abbreviation for "a methacrylate and an acrylate", the same hereinafter) having an alkyl group having 1 to 18 carbon atoms, such as methyl acrylate, ethyl acrylate, n-butyl acrylate, n-dodecyl acrylate, methyl methacrylate, or ethyl methacrylate; a (meth)acrylate having an alkoxyalkyl group having 2 to 12 carbon atoms, such as methoxymethyl acrylate, methoxyethyl acrylate, or methoxyethyl methacrylate; a (meth)acrylate having a cyanoalkyl group having 2 to 12 carbon atoms, such as α-cyanoethyl acrylate, α-cyanoethyl methacrylate, or α-cyanobutyl methacrylate; a (meth)acrylate having a hydroxyalkyl group having 1 to 12 carbon atoms, such as 2-hydroxyethyl acrylate, 2-hydroxypropyl acrylate, or 2-hydroxyethyl methacrylate; a (meth)acrylate having a fluoroalkyl group having 1 to 12 carbon atoms, such as trifluoroethyl acrylate or tetrafluoropropyl methacrylate; an α,β-ethylenically unsaturated dicarboxylic acid dialkyl ester such as dimethyl maleate, dimethyl fumarate, dimethyl itaconate, or diethyl itaconate; and a dialkylamino group-containing α,β-ethylenically unsaturated carboxylic acid ester such as dimethylaminomethyl acrylate or diethylaminoethyl acrylate.

Examples of the fluorine-containing vinyl monomer include fluoroethyl vinyl ether, fluoropropyl vinyl ether, o-trifluoromethyl styrene, vinyl pentafluorobenzoate, difluoroethylene, and tetrafluoroethylene.

Examples of the copolymerizable anti-aging agent include N-(4-anilinophenyl) acrylamide, N-(4-anilinophenyl) methacrylamide, N-(4-anilinophenyl) cinnamamide, N-(4-anilinophenyl) crotonamide, N-phenyl-4-(3-vinyl benzyloxy) aniline, and N-phenyl-4-(4-vinylbenzyloxy) aniline.

These other copolymerizble monomers may be used combination of a plurality of kinds thereof. The content of the other monomer unit is preferably 50% by weight or less, more preferably 30% by weight or less, and still more preferably 10% by weight or less with respect to the total monomer units.

The iodine value of the carboxyl group-containing highly saturated nitrile rubber (A) used in the present invention is preferably 120 or less, more preferably 60 or less, still more preferably 40 or less, and particularly preferably 30 or less. By setting the iodine value to 120 or less, heat resistance of an obtained cross-linked rubber product can be improved.

The polymer Mooney viscosity ($ML_{1+4}$, 100° C.) of the carboxyl group-containing highly saturated nitrile rubber (A) is preferably from 10 to 200, more preferably from 20 to 150, and still more preferably from 30 to 110. When the polymer Mooney viscosity of the carboxyl group-containing highly saturated nitrile rubber (A) is equal to or more than the lower limit value of the above range, a phenomenon that a mechanical characteristic of an obtained cross-linked rubber product is lowered excessively can be suppressed. On the contrary, when the polymer Mooney viscosity is equal to or less than the upper limit value of the above range, a phenomenon that processability of a rubber composition lowered excessively can be suppressed.

Further, the content of a carboxyl group in the carboxyl group-containing highly saturated nitrile rubber (A), that is, the molar amount of a carboxyl group per 100 g of the carboxyl group-containing highly saturated nitrile rubber (A) is preferably from 0.005 to 0.116 ephr, more preferably from 0.012 to 0.087 ephr, and particularly preferably from 0.023 to 0.058 ephr. When the content of a carboxyl group in the carboxyl group-containing highly saturated nitrile rubber (A) is equal to or more than the lower limit value of the above range, a phenomenon that a characteristic of an obtained cross-linked rubber product at a high temperature, specifically the tensile strength at a high temperature is lowered excessively can be suppressed. On the contrary, when the content is equal to or less than the upper limit value of the above range, a phenomenon that the compression set resistance and the heat resistance are lowered excessively can be suppressed.

A method for manufacturing the carboxyl group-containing highly saturated nitrile rubber (A) used in the present invention is not particularly limited. However, the carboxyl group-containing highly saturated nitrile rubber (A) is preferably manufactured by preparing a latex of a copolymer rubber by copolymerizing the above monomers by emulsion polymerization using an emulsifier, and hydrogenating the latex as necessary. In emulsion polymerization, a polymerization auxiliary material which is usually used, such as an emulsifier, a polymerization initiator, or a molecular weight adjusting agent can be used.

The emulsifier is not particularly limited. However, examples thereof include a non-ionic emulsifier such as a polyoxyethylene alkyl ether, a polyoxyethylene alkylphenol ether, a polyoxyethylene alkyl ester, or a polyoxyethylene sorbitan alkyl ester; an anionic emulsifier such as a salt of a fatty acid such as myristic acid, palmitic acid, oleic acid, or linolenic acid, an alkylbenzene sulfonate such as sodium dodecylbenzene sulfonate, a higher alcohol sulfate, or alkyl sulfosuccinate; and a copolymerizable emulsifier such as a sulfo ester of an α,β-unsaturated carboxylic acid, a sulfate ester of an α,β-unsaturated carboxylic acid, or a sulfoalkyl aryl ether. The use amount of the emulsifier is preferably from 0.1 to 10 parts by weight with respect to 100 parts by weight of the total monomers constituting the carboxyl group-containing highly saturated nitrile rubber (A).

The polymerization initiator is not particularly limited as long as being a radical initiator. Examples thereof include an inorganic peroxide such as potassium persulfate, sodium persulfate, ammonium persulfate, potassium perphosphate, or hydrogen peroxide; an organic peroxide such as t-butyl peroxide, cumene hydroperoxide, p-menthane hydroperoxide, di-t-butyl peroxide, t-butyl cumyl peroxide, acetyl peroxide, isobutyryl peroxide, octanoyl peroxide, dibenzoyl peroxide, 3,5,5-trimethyl hexanoyl peroxide, or t-butyl peroxy isobutyrate; and an azo compound such as azobisisobutyronitrile, azobis-2,4-dimethylvaleronitrile, azobiscyclohexane carbonitrile, or azobis(isobutyric acid methyl). These polymerization initiators can be used singly or in combination of two or more kinds thereof. As the polymerization initiator, an inorganic or organic peroxide is preferable. When a peroxide is used as the polymerization initiator, the peroxide can be used as a redox polymerization initiator in combination with a reducing agent such as sodium bisulfite or ferrous sulfate. The use amount of the polymerization initiator is preferably from 0.01 to 2 parts by weight with respect to 100 parts by weight of the total monomers.

The molecular weight adjusting agent is not particularly limited. However, examples thereof include mercaptans such as t-dodecyl mercaptan, n-dodecyl mercaptan, or octyl mercaptan; a halogenated hydrocarbon such as carbon tetrachloride, methylene chloride, or methylene bromide; α-methylstyrene dimer; and a sulfur-containing compound such as tetraethyl thiuram disulfide, dipentamethylene thiuram disulfide, or diisopropyl xanthogen disulfide. These compounds can be used singly or in combination of two or more kinds thereof. Among these compounds, mercaptans are preferable, and t-dodecyl mercaptan is more preferable. The use amount of the molecular weight adjusting agent is preferably from 0.1 to 0.8 parts by weight with respect to 100 parts by weight of the total monomers constituting the carboxyl group-containing highly saturated nitrile rubber (A).

Water is usually used for a medium in emulsion polymerization. The amount of water used in emulsion polymerization is preferably from 80 to 500 parts by weight with respect to 100 parts by weight of the total monomers constituting the carboxyl group-containing highly saturated nitrile rubber (A).

In emulsion polymerization, a polymerization auxiliary material such as a stabilizer, a dispersing agent, a pH adjusting agent, an oxygen scavenger, or a particle diameter adjusting agent can be further used as necessary. When these agents are used, the kind or the use amount thereof is not particularly limited.

Note that, when the iodine value of a copolymer obtained by copolymerization is higher than 120, hydrogenation (hydrogenation reaction) of the copolymer may be performed in order to make the iodine value 120 or less. In this case, a method for hydrogenation is not particularly limited, but a known method can be used.

A content ratio of the carboxyl group-containing highly saturated nitrile rubber (A) in the cross-linkable nitrile rubber composition of the present invention is 30% by weight or more, preferably 50% by weight or more, and more preferably 60% by weight or more when the total amount of the carboxyl group-containing highly saturated nitrile rubber (A) and the resin (B) is 100% by weight.

When the content ratio of the carboxyl group-containing highly saturated nitrile rubber (A) is too small, compression set resistance of an obtained cross-linked rubber product is deteriorated.

Resin (B)

The cross-linkable nitrile rubber composition of the present invention contains the resin (B). As the resin (B) used in the present invention, a polyester resin or a polyamide resin is preferably used.

The polyester resin is not particularly limited as long as being a polymer having an ester bond and being a resin obtained by poly condensation between a polyhydric alcohol and a polybasic acid or a polybasic acid ester compound. However, a generally known polyester ruin such as an alkyd resin, a maleic acid resin, a saturated polyester resin, or an unsaturated polyester resin can be used.

Examples of the polyhydric alcohol include ethylene glycol, diethylene glycol, triethylene glycol, propylene glycol, butylene glycol, trimethylene glycol, and cyclohexane dimethanol.

Examples of the polybasic acid include phthalic acid, fumaric acid, adipic acid, and naphthalene-2,6-dicarboxylic acid.

Among these compounds, as the polyester resin, an aromatic polyester resin such as polyethylene terephthalate, polybutylene terephthalate, or polyethylene naphthalate obtained by using ethylene glycol, butylene glycol, or trimethylene glycol as a polyhydric alcohol, and using phthalic acid or naphthalene-2,6-dicarboxylic acid as a polybasic acid is particularly preferable from a viewpoint of heat resistance, a mechanical strength, and the like.

The weight average molecular weight of the polyester resin used in the present invention is preferably from 40,000 to 100,000, and more preferably from 60,000 to 100,000. The melting point of the polyester resin is preferably from 180 to 300° C., more preferably from 190 to 280° C., and still more preferably from 200 to 260° C. from a viewpoint of being capable of effectively preventing thermal deterioration of components during processing while the heat resistance of an obtained cross-linked rubber product is excellent. Note that, the melting point of the polyester resin can be determined from a peak temperature of heat of fusion using a differential scanning calorimeter, for example.

When a polyester resin is used as the resin (B), a content ratio of the polyester resin in the cross-linkable nitrile rubber composition of the present invention is from 15 to 50% by weight, preferably from 18 to 45% by weight, and more preferably from 20 to 40% by weight when the total amount of the carboxyl group-containing highly saturated nitrile rubber (A) and the resin (B) is 100% by weight. When the content ratio of the polyester resin is equal to or more than the lower limit value of the above range, a phenomenon that heat resistance, fuel oil resistance, a tensile strength, a tensile stress, and a compression stress are deteriorated excessively can be suppressed. On the contrary, when the content ratio is equal to or less than the upper limit value of the above range, a phenomenon that processability is deteriorated excessively can be suppressed.

The polyamide resin is not limited as long as being a polymer having an acid amide bond (—CONH—). However, examples thereof include a polymer obtained by polycondensation between a diamine and a dibasic acid, a polymer obtained by polycondensation between a diamine derivative such as diformyl and a dibasic acid, a polymer obtained by polycondensation between a dibasic acid derivative such as a dimethyl ester and a diamine, a polymer obtained by a reaction between dinitrile or diamide and formaldehyde, a polymer obtained by polyaddition between diisocyanate and a dibasic acid, a polymer obtained by self-condensation of amino acid or a derivative thereof, and a polymer obtained by ring-opening polymerization of a lactam. These polyamide resins may contain a polyether block.

Specific examples of the polyamide resin include an aliphatic polyamide resin such as nylon 46, nylon 6, nylon 66, nylon 610, nylon 612, nylon 11, or nylon 12; and an aromatic polyamide resin such as polyhexamethylene diamine terephthalamide, polyhexamethylene isophthalamide, or xylene-containing polyamide. Among these compounds, an aliphatic polyamide resin is preferable because a more remarkable effect of the present invention is obtained. Nylon 6, nylon 66, nylon 11, and nylon 12 are more preferable. Nylon 66, nylon 11, and nylon 12 are still more preferable. Nylon 66 and nylon 12 are particularly preferable.

Further, the polyamide resin used in the present invention has a melting point preferably of 150 to 350° C., more preferably of 170 to 330° C., and still more preferably of 200 to 300° C. When the melting point is equal to or more than the lower limit value of the above range, a phenomenon that the heat resistance of an obtained cross-linked rubber product is lowered excessively can be suppressed. On the contrary, when the melting point is equal to or less than the upper limit value of the above range, a phenomenon that processability lowered excessively can be suppressed.

When a polyamide resin is used as the resin (B), a content ratio of the polyamide resin in the cross-linkable nitrile rubber composition of the present invention is from 5 to 50% by weight, preferably from 10 to 45% by weight, and more preferably from 15 to 40% by weight when the total amount of the carboxyl group-containing highly saturated nitrile rubber (A) and the resin (B) is 100% by weight. When the content of the polyamide resin is equal to or more than the lower limit value of the above range, a phenomenon that fuel oil resistance is lowered excessively can be suppressed. On the contrary, when the content of the polyamide resin is equal to or less than the upper limit value of the above range, a phenomenon that processability is deteriorated and hardness is too high can be suppressed.

Note that, it is effective to mix a polyamide resin with a highly saturated nitrile rubber in order to improve fuel oil resistance of the highly saturated nitrile rubber. However, when the polyamide resin is simply mixed with the highly saturated nitrile rubber, processability may be deteriorated, the tensile strength of an obtained cross-linked rubber product may be lowered, and the hardness may be too high disadvantageously.

On the contrary, when a polyamide resin is used in the present invention, by blending the polyamide resin as the resin (B) to the above carboxyl group-containing highly saturated nitrile rubber (A) as a main component, processability thereof can be improved. In addition, when a cross-linked rubber product is obtained, the compression set resistance, fuel oil resistance, original state properties, and heat aging resistance can be improved, and a phenomenon that hardness is too high can be suppressed.

Preparation of Highly Saturated Nitrile Rubber Composition

A highly saturated nitrile rubber composition is prepared by kneading the carboxyl group-containing highly saturated nitrile rubber (A) and the resin (B) described above at a temperature equal to or higher than the melting point of the resin (B). In the present invention, by kneading the carboxyl group-containing highly saturated nitrile rubber (A) and the resin (B) at a temperature equal to or higher than the melting point of the resin (B), the resin (B) can be kneaded in a melted state, and the carboxyl group-containing highly saturated nitrile rubber (A) and the resin (B) can be therefore mixed uniformly. Therefore, an effect obtained by blending the resin (B), that is, an effect that a cross-linked rubber product after cross-linking can have excellent heat aging resistance and excellent fuel oil resistance and can have highly balanced original state properties (tensile strength, elongation at break, and tensile stress) and compression set resistance can be obtained properly. On the contrary, by setting the kneading temperature to a temperature lower than the melting point of the resin (B), components cannot be mixed uniformly, and an obtained cross-linked rubber product has poor tensile strength, poor elongation at break, poor heat aging resistance, and poor compression set resistance.

When the carboxyl group-containing highly saturated nitrile rubber (A) and the resin (B) are kneaded, the temperature is only required to be equal to or higher than the melting point of the resin (B), but is preferably a temperature 5° C. or more higher than the melting point of the resin (B), and more preferably a temperature 10° C. or more higher than the melting point of the resin (B). The upper limit of the temperature at the time of kneading is not particularly limited, but is preferably 400° C. or lower, and more preferably 350° C. or lower from a viewpoint of effectively preventing thermal deterioration of components.

When the carboxyl group-containing highly saturated nitrile rubber (A) and the resin (B) are kneaded, a mixing method thereof is not limited particularly, but examples thereof include a mixing method for imparting a shearing force, such as a mixing method using an extruder such as a twin-screw extruder, or a method using a closed type kneader such as a Banbury mixer, a Brabender mixer, an internal mixer, or a kneader, or a roll kneader from a viewpoint of further enhancing a mixing property of components.

Note that, when the carboxyl group-containing highly saturated nitrile rubber (A) and the resin (B) are kneaded, various compounding agents such as an anti-aging agent described below and another rubber may be mixed simultaneously.

Cross-Linkable Nitrile Rubber Composition

The cross-linkable nitrile rubber composition of the present invention is obtained by further blending the polyamine cross-linking agent (C) to the carboxyl group-containing highly saturated nitrile rubber (A) and the resin (B) described above.

Polyamine Cross-Linking Agent (C)

In the present invention, the polyamine cross-linking agent (C) is used as a cross-linking agent. By using the polyamine cross-linking agent (C) as a cross-linking agent, the compression set resistance of an obtained cross-linked rubber product is improved.

The polyamine cross-linking agent (C) used in the present invention is not particularly limited as long as being a compound having two or more amino groups or a compound to become a compound having two or more amino groups during cross-linking. However, the polyamine cross-linking agent (C) is preferably a compound in which a plurality of hydrogen atoms in an aliphatic hydrocarbon or an aromatic hydrocarbon is replaced with amino groups or hydrazide structures (represented by —$CONHNH_2$, CO represents a carbonyl group) or a compound to become the compound during cross-linking. Specific examples thereof include aliphatic polyvalent amines such as hexamethylenediamine, hexamethylenediamine carbamate, tetramethylene pentamine, a hexamethylenediamine cinnamaldehyde adduct, or hexamethylenediamine dibenzoate salt; aromatic polyvalent amines such as 2,2-bis{4-(4-aminophenoxy) phenyl} propane, 4,4'-methylenedianiline, m-phenylenediamine, p-phenylenediamine, or 4,4'-methylenebis(o-chloroaniline); and a compound having two or more hydrazide structures, such as isophthalic acid dihydrazide, adipic acid dihydrazide, or sebacic acid dihydrazide. Among these compounds, hexamethylenediamine carbamate is particularly preferable.

The blending amount of the polyamine cross-linking agent (C) in the cross-linkable nitrile rubber composition of the present invention is preferably from 0.1 to 20 parts by weight, more preferably from 0.2 to 15 parts by weight, and still more preferably from 0.5 to 10 parts by weight with respect to 100 parts by weight of the total amount of the carboxyl group-containing highly saturated nitrile rubber (A) and the resin (B). When the blending amount of the polyamine cross-linking agent (C) is equal to or more than the lower limit value of the above range, a phenomenon that a mechanical characteristic and compression set resistance of an obtained cross-linked rubber product are lowered excessively can be suppressed. On the contrary, when the blending amount is equal to or less than the upper limit value of the above range, a phenomenon that fatigue resistance of an obtained cross-linked rubber product is deteriorated excessively can be suppressed.

Basic Cross-Linking Accelerator

The cross-linkable nitrile rubber composition of the present invention preferably contains a basic cross-linking accelerator in addition to the carboxyl group-containing highly saturated nitrile rubber (A), the resin (B), and the polyamine cross-linking agent (C). Due to the basic cross-linking accelerator contained in the cross-linkable nitrile rubber composition, a more remarkable effect of the present invention obtained.

Specific examples of the basic cross-linking accelerator include a basic cross-linking accelerator having a cyclic amidine structure, such as 1,8-diazabicyclo [5,4,0] undecene-7 (hereinafter, also abbreviated as "DBU") and 1,5-diazabicyclo [4,3,0] nonene-5 (hereinafter, also abbreviated as "DEN"), 1-methylimidazole, 1-ethylimidazole, 1-phenylimidazole, 1-benzylimidazole, 1,2-dimethylimidazole, 1-ethyl-2-methylimidazole, 1-methoxy ethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxy imidazole, 1-methyl-2-ethoxy imidazole, 1-methyl-4-methoxy imidazole, 1-methyl-2-methoxy imidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl) imidazole, 1-methyl benzimidazole, 1-methyl-2-benzyl benzimidazole, 1-methyl-5-nitrobenzimidazole, 1-methyl imidazoline, 1,2-dimethyl imidazoline, 1,2,4-trimethyl imidazoline, 1,4-dimethyl-2-ethyl imidazoline, 1-methyl-phenyl imidazoline, 1-methyl-2-benzyl imidazoline, 1-methyl-2-ethoxy imidazoline, 1-methyl-2-heptyl imidazoline, 1-methyl-2-undecyl imidazoline, 1-methyl-2-heptadecyl imidazoline, 1-methyl-2-ethoxymethyl imidazoline, or 1-ethoxymethyl-2-methyl imidazoline; a guanidine-based basic cross-linking accelerator such as tetramethyl guanidine, tetraethyl guanidine, diphenyl guanidine, 1,3-di-ortho-tolyl guanidine, or ortho-tolyl biguanide; an aldehyde amine-based basic cross-linking accelerator such as n-butyl aldehyde aniline or acetaldehyde ammonia; and a secondary amine compound in which two cycloalkyl groups are bonded to a nitrogen atom, such as dicyclohexyl amine. Among these compounds, a guanidine-based basic cross-linking accelerator and a basic cross-linking accelerator having a cyclic amidine structure are preferable. A basic cross-linking accelerator having a cyclic amidine structure is more preferable. 1,8-diazabicyclo [5,4,0] undecene-7 and 1,5-diazabicyclo [4,3,0] nonene-5 are still more preferable. 1,8-diazabicyclo [5,4,0] undecene-7 is particularly preferable.

When the basic cross-linking accelerator is blended, the blending amount thereof in the cross-linkable nitrile rubber composition of the present invention is preferably from 0.1 to 20 parts by weight, more preferably from 0.2 to 15 parts by weight, and still more preferably from 0.5 to 10 parts by weight with respect to 100 parts by weight of the carboxyl group-containing highly saturated nitrile rubber (A). When the blending amount of the basic cross-linking accelerator is equal to or more than the lower limit value of the above range, a phenomenon that a cross-linking density is lowered excessively can be suppressed due to a too low cross-linking speed of the cross-linkable nitrile rubber composition. On the contrary, when the blending amount is equal to or less than the upper limit value of the above range, a phenomenon that storage stability of the cross-linkable nitrile rubber composition is impaired excessively can be suppressed.

Further, a compounding agent usually used in a rubber field can be blended to the cross-linkable nitrile rubber composition of the present invention in addition to the above compounds. Examples thereof include a reinforcing agent such as carbon black or silica, a filler such as calcium carbonate, talc, or clay, a metal oxide such as zinc oxide or magnesium oxide, an $\alpha,\beta$-ethylenically unsaturated carboxylic acid metal salt such as zinc methacrylate or zinc acrylate, a co-cross-linking agent, a cross-linking aid, a cross-linking retarder, an anti-aging agent, an antioxidant, a light stabilizer, a scorch preventer such as a primary amine, an active agent such as diethylene glycol, a silane coupling agent, a plasticizer, a processing aid, a slip agent, an adhesive, a lubricant, a flame retardant, a fungicide, an acid acceptor, an antistatic agent, a pigment, and a foaming agent. The blending amount of these compounding agents is not particularly limited as long as being within a range not inhibiting an object or an effect of the present invention, and can be an amount according to a blending purpose.

Examples of the carbon black include furnace black, acetylene black, thermal black, channel black, Austin black, and graphite. These carbon blacks can be used singly or in combination of a plurality of kinds thereof.

Examples of the silica include a natural silica such as quartz powder or silica stone powder; and a synthetic silica such as silicic anhydride (silica gel, aerosil, or the like) or hydrous silicic acid. Among these silicas, a synthetic silica is preferable. These silicas may be surface-treated with a silane coupling agent or the like.

The silane coupling agent is not particularly limited. However, examples thereof include a sulfur-containing silane coupling agent such as γ-mercaptopropyl trimethoxysilane, γ-mercaptomethyl trimethoxysilane, γ-mercaptomethyl triethoxysilane, γ-mercaptohexamethyl disilazane, bis (3-triethoxysilylpropyl) tetrasulfane, or bis(3-triethoxysilylpropyl disulfane; an epoxy group-containing silane coupling agent such as γ-glycidoxypropyl trimethoxysilane, γ-glycidoxypropyl methyldimethoxysilane, β-(3,4-epoxycyolohexyl) ethyltrimethoxyilane, γ-mercaptopropyl trimethoxysilane, or γ-glycidoxypropyl methyldiethoxysilane; an amino-group containing silane coupling agent such as N-(β-aminoethyl)-γ-aminopropyl trimethoxysilane, γ-aminopropyl trimethoxysilane, γ-aminopropyl triethoxysilane, N-2-(aminoethyl)-3-aminopropyl trimethoxysilane, N-2-(aminoethyl)-3-aminopropyl triethoxysilane, 3-triethoxysilyl-N-(1,3-dimethyl-butylidene) propylamine, or N-phenyl-3-aminopropyl trimethoxysilane; a (meth)acryloxy group-containing silane coupling agent such as γ-methacryloxypropyl trimethoxysilane, γ-methacryloxypropyl tris (β-methoxyethoxy) silane, γ-methacryloxypropyl methyl dimethoxy silane, γ-methacryloxypropyl methyl diethoxy silane, γ-methacryloxypropyl triethoxy silane, or γ-acryloxypropyl trimethoxysilane; a vinyl group-containing silane coupling agent such as vinyltrimethoxysilane, vinyltriethoxysilane, vinyltris (β-methoxyethoxy) silane, vinyl trichlorosilane, or vinyl triacetoxysilane; a chloropropyl group-containing silane coupling agent such as 3-chloropropyl trimethoxysilane; an isocyanate group-containing silane coupling agent such as 3-isocyanate propyl triethoxysilane; a styryl group-containing silane coupling agent such as p-styryl trimethoxysilane; a ureido group-containing silane coupling agent such as 3-ureido propyl triethoxysilane; an allyl group-containing silane coupling agent such as diallyl dimethyl silane; an alkoxy group-containing silane coupling agent such as tetraethoxy silane; a phenyl group-containing silane coupling agent such as diphenyl dimethoxysilane; a fluoro group-containing silane coupling agent such as trifluoropropyl trimethoxysilane; an alkyl group-containing silane coupling agent such as isobutyl trimethoxysilane or cyclohexylmethyl dimethoxysilane; an aluminum-based coupling agent such as acetoalkoxyaluminum diisoporopirate; and a titanate-based coupling agent such as isopropyltriisostearoyl titanate, isopropyltris(dioctyl pyrophosphate) titanate, isopropyl tri(N-aminoethyl-aminoethyl) titanate, tetraoctylbis(ditridecylphosphite) titanate, tetra(2,2-diallyloxymethyl-1-butyl) bis(ditridecyl) posphite titanate, bis(dioctyl pyrophosphate) oxy acetate titanate, bis(dioctyl pyrophosphate) ethylene titanate, tetraisopropyl bis(dioctyl phosphite) titanate, or isopropyltriisostearoyl titanate. These compounds can be used singly or in combination of a plurality of kinds thereof.

The co-cross-linking agent is not particularly limited. However, a low molecular or high molecular compound having a plurality of radically reactive unsaturated groups in a molecule thereof is preferable. Examples thereof include a polyfunctional vinyl compound such as divinyl benzene or divinyl naphthalene; isocyanurates such as triallyl isocyanurate or trimethallyl isocyanurate; cyanurates such as triallyl cyanurate, maleimides such as N,N'-m-phenylene dimaleimide; an allyl ester of a polyacid such as diallyl phthalate, diallyl isophthalate, diallyl maleate, diallyl fumarate, diallyl sebacate, or triallyl phosphate; diethylene glycol bisallylcarbonate; allyl ethers such as ethylene glycol diallyl ether, a triallyl ether of trimethylol propane, or a partial allyl ether of pentaerythritol; an allyl-modified resin such as allylated novolak or an allylated resol resin; and a tri- to pentafunctional methacrylate or acrylate compound such as trimethylolpropane trimethacrylate or trimethylolpropane triacrylate. These compounds can be used singly or in combination of a plurality of kinds thereof.

The plasticizer is not particularly limited. However, examples thereof include a trimellitic acid-based plasticizer, a pyromellitic acid-based plasticizer, an ether ester-based plasticizer, a polyester-based plasticizer, a phthalic acid-based plasticizer, an adipate-based plasticizer, a phosphate-based plasticizer, a sebacate-based plasticizer, an alkyl sulfonate compound-based plasticizer, and an epoxidized vegetable oil-based plasticizer. Specific examples thereof include tri-2-ethylhexyl trimellitate, isononyl trimellitate, mixed linear alkyl trimellitate, a dipentaerythritol ester, 2-ethylhexyl pyromellitate, a polyether ester (molecular weight of about 300 to 5000), bis[2-(2-butoxyethoxy) ethyl] adipate, dioctyl adipate, an adipic acid-based polyester (molecular weight of about 300 to 5000), dioctyl phthalate, diisononyl phthalate, dibutyl phthalate, tricresyl phosphate, dibutyl sebacate, phenyl alkylsulfonate, and epoxidized soybean oil. These plasticizers can be used singly or in combination of a plurality of kinds thereof.

A polymer other than the carboxyl group-containing highly saturated nitrile rubber (A) and the resin (B) described above may be blended to the cross-linkable nitrile rubber composition of the present invention within a range not inhibiting an effect of the present invention. Examples of the other polymer include a nitrile rubber (including a saturated nitrile rubber) other than the carboxyl group-containing highly saturated nitrile rubber (A), an acrylic rubber, an ethylene-acrylic acid copolymer rubber, a fluorine rubber, a styrene-butadiene copolymer rubber, a polybutadiene rubber, an ethylene-propylene copolymer rubber, an ethylene-propylene-diene terpolymer rubber, an epichlorohydrin rubber, a urethane rubber, a chloroprene rubber, a silicone rubber, a fluorosilicone rubber, a chlorosulfonated polyethylene rubber, a natural rubber, and a polyisoprene rubber. When the other polymer is blended, the blending amount thereof in the cross-linkable nitrile rubber composition is preferably 30 parts by weight or less, more preferably 20 parts by weight or less, and still more preferably 10 parts by weight or less with respect to 100 parts by weight of the total amount of the carboxyl group-containing highly saturated nitrile rubber (A) and the resin (B).

Preparation of Cross-Linkable Nitrile Rubber Composition

A method for preparing the cross-linkable nitrile rubber composition of the present invention is not particularly limited. However, examples thereof include a method for kneading a highly saturated nitrile rubber composition obtained as described above (composition obtained by mixing the carboxyl group-containing highly saturated nitrile rubber (A) and the resin (B) at a temperature equal to or higher than the melting point of the resin (B)) with the polyamine cross-linking agent (C) and components (excluding a thermally unstable component) preferably at 10 to 200° C., more preferably at 20 to 170° C. using a mixer such as a Banbury mixer, a Brabender mixer, an inter mixer, or a kneader, transferring the resulting product to a roll or the like, adding the cross-linking agent (C), a thermally unstable cross-linking aid, or the like thereto, and subjecting the resulting product to secondary kneading preferably at 10 to 80° C.

Cross-Linked Rubber Product

The cross-linked rubber product of the present invention is obtained by cross-linking the above cross-linkable nitrile rubber composition of the present invention.

The cross-linked rubber product of the present invention can be manufactured by forming the above cross-linkable nitrile rubber composition of the present invention, for example, with a forming machine corresponding to a desired shape, for example, with an extruder, an injection forming machine, a compressor, or a roll, performing a cross-linking reaction by heating, and fixing a shape as the cross-linked rubber product. In this case, cross-linking may be performed after performing or simultaneously with forming. The forming temperature is usually from 10 to 200° C., and preferably from 25 to 120° C. The cross-linking temperature is usually from 100 to 200° C., and preferably from 130 to 190° C. The cross-linking time is usually from 1 minute to 24 hours, and preferably from 2 minutes to 6 hours.

Further, there is a case where a surface is cross-linked but an inside is not sufficiently cross-linked in some shapes or sizes of a cross-linked rubber product. Therefore, secondary cross-linking may be performed by further heating.

As a heating method, a general method used for cross-linking rubber, such as heating, steam heating, oven heating, or hot air heating may be appropriately selected.

The cross-linked rubber product of the present invention obtained in this way is obtained by using the highly saturated nitrile rubber composition and the cross-linkable nitrile rubber composition described above, and therefore has excellent compression set resistance and highly balanced heat aging resistance, fuel oil resistance, and original state properties (tensile strength, elongation at break, and tensile stress). Particularly, the cross-linked rubber product of the present invention has a 100% tensile stress preferably of 10 MPa or more, more preferably of 15 MPa or more, and particularly preferably of 20 MPa or more.

Therefore, the cross-linked rubber product of the present invention can be used in a wide range of applications by taking advantage of such a characteristic. Examples of the applications include various kinds of sealing materials such as an O-ring, a packing, a diaphragm, an oil seal, a shaft seal, a bearing seal, a wellhead seal, a seal for pneumatic equipment, a seal for sealing fluorocarbon, fluorohydrocarbon, or carbon dioxide used in an air conditioner cooling device or a refrigerator compressor of an air conditioner, a seal for sealing supercritical carbon dioxide or subcritical carbon dioxide used for a cleaning medium in precision cleaning, a seal for a rolling device (a rolling bearing, an automotive hub unit, an automotive water pump, a linear guide device, a ball screw, or the like), a valve and a valve seat, a blow out pre enter (BOP), or a platter; various kinds of gaskets such as an intake manifold gasket mounted on a connecting portion between an intake manifold and a cylinder head, a cylinder head gasket mounted on a connecting portion between a cylinder block and a cylinder head, a rocker cover gasket mounted on a connecting portion between a rocket cover and a cylinder head, an oil pan gasket mounted on a connecting portion between an oil pan and a cylinder block or a transmission case, a gasket for a fuel cell separator mounted between a pair of housings sandwiching a unit cell including a positive electrode, an electrolyte plate, and a negative electrode, or a gasket for a top cover of a hard disk drive; various kinds of rolls such as a printing roll, an iron making roll, a paper making roll, an industrial roll, or a business machine roll; various kinds of belts such as a flat belt (a film core flat belt, a cord flat belt, a laminated flat belt, a single flat belt, or the like), a V belt (a wrapped V belt, a raw edge V belt, or the like), a V ribbed belt (a single V ribbed belt, a double V ribbed belt, a wrapped V ribbed belt, a rear rubber V ribbed belt, an upper cog V ribbed belt, or the like), a CVT belt, a timing belt, a toothed belt, or a conveyor belt; various kinds of hoses such as a fuel hose, a turbo air hose, an oil hose, a radiator hose, a heater hose, a water hose, a vacuum brake hose, a control hose, an air conditioning hose, a brake hose, a power steering hose, an air hose, a marine hose, a riser, or a flow line; various kinds of boots such as a CVJ boot, a propeller shaft boot, a constant velocity joint boot, or a rack and pinion boot; a damping material rubber part such as a cushioning material, a dynamic damper, a rubber coupling, an air spring, or a vibration preventing material; a dust cover, an automotive interior component, a tire, a coating cable, a shoe sole, an electromagnetic shielding, an adhesive such as an adhesive for a flexible printed board, a fuel cell separator, and an electronic field. Among these applications, the cross-linked rubber product of the present invention can be preferably used for a sealing material. Particularly, the cross-linked rubber product of the present invention has highly balanced tensile strength, elongation, tensile stress, and compression stress, and therefore can suppress the deformation amount to a low amount even under a high pressure condition. Therefore, the cross-linked rubber product of the present invention can be particularly preferably used for a high pressure sealing material (for example, a sealing material used while a pressure of 1 MPa or more is applied).

EXAMPLES

Hereinafter, the present invention will be described more specifically by showing Examples and Comparative Examples. However, the present invention is not limited to these Examples. Hereinafter, "part" is based on a weight unless otherwise specified. A test or an evaluation method for physical properties and characteristics is as follows.

Rubber Composition

A content ratio of each of monomer units constituting a carboxyl group-containing highly saturated nitrile rubber was measured by the following method.

That is, the content ratio of a mono-n-butyl maleate unit was calculated by adding 100 ml of 2-butanone to 0.2 g of a 2 mm square highly saturated nitrile rubber, stirring the resulting mixture for 16 hours, then adding 20 ml of ethanol and 10 ml of water, determining the molar amount of carboxyl groups with respect to 100 g of the highly saturated nitrile rubber by titration with thymol phthalein as an indicator at room temperature using a 0.02 N water-containing ethanol solution of potassium hydroxide under stirring, and converting the determined molar amount into the amount of the mono-n-butyl maleate unit.

The content ratio of each of a 1,3-butadiene unit and a saturated butadiene unit was calculated by measuring the iodine values (in accordance with JIS K 6235) before and after a hydrogenation reaction using a highly saturated nitrile rubber.

The content ratio of an acrylonitrile unit was calculated by measuring the content of nitrogen in a highly saturated nitrile rubber in accordance with JIS K 6383 by a Kjeldahl method.

Iodine Value

The iodine value of a carboxyl group-containing highly saturated nitrile rubber was measured in accordance with JIS K 6235.

Content of Carboxyl Group 100 ml of 2-butanone was added to 0.2 g of a 2 mm square carboxyl group-containing highly saturated nitrile rubber. The resulting mixture was stirred for 16 hours, then 20 ml of ethanol and 10 ml of water was added, and the content of a carboxyl group was determined by titration with thymol phthalein as an indicator at room temperature using a 0.02 N water-containing ethanol solution of potassium hydroxide under stirring as the molar amount of carboxyl groups with respect to 100 g of the highly saturated nitrile rubber (unit: ephr).

Mooney Viscosity (Polymer Mooney)

The Mooney viscosity (polymer Mooney) of a carboxyl group-containing highly saturated nitrile rubber was measured in accordance with JIS K 6300-1 (unit: [$ML_{1+4}$, 100° C.]

Original State Properties (Tensile Strength, Elongation at Break, 100% Tensile Stress)

A cross-linkable nitrile rubber composition was put in a mold having a vertical length of 15 cm, a horizontal length of 15 cm, and a depth of 0.2 cm, and was subjected to press forming at 170° C. for 20 minutes while being pressed at a pressing pressure of 10 MPa to obtain a sheet-shaped cross-linked rubber product. The resulting sheet-shaped cross-linked rubber product was punched with a No. 3 dumbbell to prepare a test piece. The tensile strength, the elongation at break, and the 100% tensile stress of the cross-linked rubber product were measured by using the resulting test piece in accordance with JIS K 6251.

Heat Aging Resistance

A sheet-shaped cross-linked rubber product was obtained in a similar manner to the above evaluation for original state properties, and was then subjected to an air heating aging test in accordance with JIS K 6257. Specifically, the resulting sheet-shaped cross-linked rubber product was held in a gear oven at a temperature of 150° C. for 168 hours, and was then subjected to a tensile test in a similar manner to the above original state properties. An elongation change ratio was measured by the following formula. It can be determined that an elongation change ratio closer to zero makes heat aging resistance better.

Elongation change ratio (%)={((Elongation After Heat Aging)−(Elongation in Normal State))/(Elongation in Normal State)}×100

Fuel Oil Resistance Test

A sheet-shaped cross-linked rubber product was obtained in a similar manner to the above evaluation for original state properties, and was then subjected to a fuel oil resistance test by dipping the cross-linked rubber product in test fuel oil (Fuel-C) of isooctane/toluene=50/50 (volume ratio) at a temperature of 40° C. for 168 hours in accordance with JIS K 6258. The volumes of the cross-linked rubber product before and after dipping in the test fuel oil were measured. A volume change ratio ΔV (unit: %) after dipping was calculated according to "volume change ratio ΔV=([volume after dipping−volume before dipping]/volume before dipping)×100", and fuel oil resistance was thereby evaluated. It can be determined that a smaller absolute value of the volume change ratio ΔV makes the degree of swelling due to a fuel oil smaller and makes fuel oil resistance better.

Compression Set Test (O-Ring Compression Set)

A cross-linkable nitrile rubber composition was cross-linked using a mold having an inner diameter of 30 mm and a ring diameter of 3 mm at 170° C. at a press pressure of 10 MPa for 20 minutes, and was then subjected to secondary cross-linking at 170° C. for 4 hours to obtain a test piece for an O-ring set test. Then, an O-ring compression set was measured in accordance with JIB K 6262 under a condition that a state in which a distance between two planes sandwiching an O-ring was compressed by 25% in a ring thickness direction was maintained at 150° C. for 168 hours.

Synthesis Example 1 (Synthesis of Carboxyl Group-Containing Highly Saturated Nitrile Rubber (a-1))

In a reactor, 180 parts of ion-exchanged water, 25 parts of a sodium dodecylbenzenesulfonate aqueous solution having a concentration of 10% by weight, 36 parts of acrylonitrile (hereinafter, also referred to as "AN"), 4 parts of mono-n-butyl maleate (hereinafter, also referred to as "MBM"), and 0.5 parts of t-dodecylmercaptan (molecular weight adjusting agent) were put in this order. Gas inside the reactor was replaced with nitrogen three times. Thereafter, 60 parts of 1,3-butadiene (hereinafter, also referred to as "BD") was put therein. Subsequently, the reactor was maintained at 5° C., 0.1 parts of cumene hydroperoxide (polymerization initiator) was put therein, and a polymerization reaction was continued under stirring. When a polymerization conversion ratio reached 85%, 0.1 parts of a hydroquinone aqueous solution (polymerization terminator) having a concentration of 10% by weight was added to terminate the polymerization reaction. Subsequently, the residual monomers were removed under reduced pressure at a water temperature of 60° C. to obtain a latex of a carboxyl group-containing nitrile rubber (solid content concentration: about 30% by weight).

Subsequently, the latex of a carboxyl group-containing nitrile rubber and a palladium catalyst (a solution obtained by mixing a 1% by weight palladium acetate acetone solution and ion-exchanged water in equal weights) were added into an autoclave such that the content of palladium with respect to the dry weight of a rubber contained in the latex of a nitrile rubber obtained above was 1,000 ppm by weight. A hydrogenation reaction was performed at a hydrogen pressure of 3 MPa at a temperature of 50° C. for 6 hours to obtain a latex of a carboxyl group-containing highly saturated nitrile rubber (a-1).

Then, methanol having a volume of two times was added to the resulting latex, and the resulting mixture was solidified. Thereafter, the resulting product was vacuum-dried at 60° C. for 12 hours to obtain the carboxyl group-containing highly saturated nitrile rubber (a-1). Each of monomer units of the resulting carboxyl group-containing highly saturated nitrile rubber (a-1) had a composition of 36% by weight of acrylonitrile units, 4% by weight of mono-n-butyl maleate units, and 60% by weight of 1,3-butadiene units (including a hydrogenated portion), an iodine value of 10, a carboxyl group content of $3.0 \times 10^{-2}$ ephr, and a polymer Mooney viscosity [$ML_{1+4}$, 100° C.] of 55.

Synthesis Example 2 (Synthesis of Carboxyl Group-Containing Highly Saturated Nitrile Rubber (a-2))

In a reactor, 180 parts of ion-exchanged water, 25 parts of a sodium dodecylbenzenesulfonate aqueous solution having a concentration of 10% by weight, 21 parts of acrylonitrile, 5 parts of mono-n-butyl maleate, 35 parts of n-butyl acrylate, and 0.5 parts of t-dodecylmercaptan (molecular weight adjusting agent) were put in this order. Gas inside the reactor was replaced with nitrogen three times. Thereafter, 39 parts of 1,3-butadiene was put therein. Subsequently, the reactor was maintained at 5° C., 0.1 parts of cumene hydroperoxide (polymerization initiator) was put therein, and a polymerization reaction was continued under stirring. When a polymerization conversion ratio reached 83%, 0.1 parts of a hydroquinone aqueous solution (polymerization terminator) having a concentration of 10% by weight was added to terminate the polymerization reaction. Subsequently, the residual monomers were removed under reduced pressure at a water temperature of 60° C. to obtain a latex of a nitrile rubber (solid content concentration: about 30% by weight).

Subsequently, the latex of a carboxyl group-containing nitrile rubber and a palladium catalyst (a solution obtained by mixing a 1% by weight palladium acetate acetone solution and ion-exchanged water in equal weights) were added into an autoclave such that the content of palladium with respect to the dry weight of a rubber contained in the latex of a nitrile rubber obtained above was 1,000 ppm by weight. A hydrogenation reaction was performed at a hydrogen pressure of 3 MPa at a temperature of 50° C. for 6 hours to obtain a latex of a carboxyl group-containing highly saturated nitrile rubber (a-2).

Then, methanol having a volume of two times was added to the resulting latex, and the resulting mixture was solidified. Thereafter, the resulting product was vacuum-dried at 60° C. for 12 hours to obtain the carboxyl group-containing highly saturated nitrile rubber (a-2). Each of monomer units of the resulting carboxyl group-containing highly saturated nitrile rubber (a-2) had a composition of 21% by weight of acrylonitrile units, 4.5% by weight of mono-n-butyl maleate units, 30% by weight of n-butyl acrylate units, and 44.5% by weight of 1,3-butadiene units (including a hydrogenated portion), an iodine value of 8, a carboxyl group content of 0.029 ephr, and a polymer Mooney viscosity [$ML_{1+4}$, 100° C.] of 48.

Synthesis Example 3 (Synthesis of Highly Saturated Nitrile Rubber (a'-3))

In a reactor, 0.2 parts of sodium carbonate was dissolved in 200 parts of ion-exchanged water, and 2.25 parts of fatty acid potassium soap (potassium salt of a fatty acid) was added thereto to prepare a soap solution. Then, 38 parts of acrylonitrile and 0.45 parts of t-dodecyl mercaptan (molecular weight adjusting agent) were put into the resulting soap solution in this order. Gas inside the reactor was replaced with nitrogen three times. Thereafter, 62 parts of 1,3-butadiene was put therein. Subsequently, an inside of the reactor was maintained at 5° C., and 0.1 parts of cumene hydroperoxide (polymerization initiator), a proper amount of reducing agent, and a proper amount of chelating agent were put therein to initiate a polymerization reaction. When a polymerization conversion ratio reached 85%, 0.1 parts of a hydroquinone (polymerization terminator) aqueous solution having a concentration of 10% was added to terminate the polymerization reaction. The residual monomers were removed using a rotary evaporator at a water temperature of 60° C. to obtain a latex of a nitrile rubber (solid content concentration: about 25% by weight).

Subsequently, the resulting latex was added to an aluminum sulfate aqueous solution in an amount of 3% by weight with respect to the content of a nitrile rubber contained in the latex, the resulting mixture was stirred, and the latex was solidified. The resulting product was filtered while being washed with water, and was then vacuum-dried at 60° C. for 12 hours to obtain a nitrile rubber. Then, the resulting nitrile rubber was dissolved in acetone such that the concentration thereof was 12%. The resulting solution was put in an autoclave. A palladium/silica catalyst was added thereto such that the content thereof was 500 ppm by weight with respect to the nitrile rubber. A hydrogenation reaction was performed at a hydrogen pressure of 3.0 MPa. After the hydrogenation reaction was terminated, the resulting product was poured into a large amount of water, was solidified, was filtered, and was dried to obtain a highly saturated nitrile rubber (a'-3). The resulting highly saturated nitrile rubber (a'-3) had a composition of 36% by weight of acrylonitrile units and 64% by weight of butadiene units (including a saturated portion), an iodine value of 7, and a polymer Mooney viscosity [$ML_{1+4}$, 100° C.] of 85. When the content of a carboxyl group in the highly saturated nitrile rubber (a'-3) was measured according to the above method, the content was below a detection limit, and the highly saturated nitrile rubber (a'-3) contained no carboxyl group substantially.

Example 1

A highly saturated nitrile rubber composition was obtained by kneading 70 parts of the carboxyl group-containing highly saturated nitrile rubber (a-1) obtained in Synthesis Example and 30 parts of nylon 66 (trade name "Amilan CM3006", manufactured by Toray Industries. Inc., polyamide resin, melting point determined from a peak temperature of heat of fusion measured using a differential scanning calorimeter: 265° C.) using a twin-screw extruder at 280° C.

Then, 20 parts of FEF carbon black (trade name "SEAST SO", manufactured by Tokai Carbon Co., Ltd., carbon black), one part of stearic acid, and 1.5 parts of 4,4'-di-(α,α-dimethylbenzyl) diphenylamine (trade name "Nocrac CD", manufactured by Ouchi Shinko Chemical Industry Co., anti-aging agent) were added to 100 parts of the resulting highly saturated nitrile rubber composition and kneaded using a Banbury mixer. Subsequently, the mixture was transferred to a roll, 3 parts of DBU (trade name: RHENOGRAN XLA-60 (GE2014), manufactured by Rhein Chemie Corporation, DBU60% (including a portion in a form of zinc diallyl diphosphate)) and 1.8 parts of hexamethylenediamine carbamate (trade name: Diak #1, manufactured by DuPont. Dow Elastomers Co., Ltd., polyamine cross-linking agent) were added thereto and kneaded to obtain a cross-linkable nitrile rubber composition.

Measurement of original state properties, evaluation for heat aging resistance, a fuel oil resistance test, and a compression set test were performed by the method described above. Table 1 indicates results thereof.

Example 2

A highly saturated nitrile rubber composition was obtained by kneading 75 parts of the carboxyl group-containing highly saturated nitrile rubber (a-1) obtained in Synthesis Example 1 and 25 parts of nylon 66 (trade name "Amilan CM3006", manufactured by Toray Industries. Inc., polyamide resin) using a twin-screw extruder at 280° C.

Further, a cross-linkable nitrile rubber composition was prepared in a similar manner to Example 1 except that the highly saturated nitrile rubber composition obtained in the above was used and the amount of hexamethylenediamine carbamate was 2 parts in obtaining the cross-linkable nitrile rubber composition.

Measurement of original state properties, evaluation for heat aging resistance, a fuel oil resistance test, and a compression set test were performed by the method described above. Table 1 indicates results thereof.

Example 3

A highly saturated nitrile rubber composition and a cross-linkable nitrile rubber composition were prepared in a similar manner to Example 1 except that the carboxyl group-containing highly saturated nitrile rubber (a-2) obtained in Synthesis Example 2 was used in place of the carboxyl group-containing highly saturated nitrile rubber (a-1) obtained in Synthesis Example 1 in obtaining the highly saturated nitrile rubber composition using a twin-screw extruder.

Measurement of original state properties, evaluation for heat aging resistance, a fuel oil resistance test, and a compression set test were performed by the method described above. Table 1 indicates results thereof.

Example 4

A highly saturated nitrile rubber composition and a cross-linkable nitrile rubber composition were prepared in a similar manner to Example 1 except that polybutylene terephthalate ((trade name "Toraycon 1401-X06", manufactured by Toray Industries. Inc., polyester resin, melting point determined from a peak temperature of heat of fusion measured using a differential scanning calorimeter: 225° C.) was used in place of nylon 66 and that the kneading temperature was changed from 280° C. to 235° C. in obtaining the highly saturated nitrile rubber composition using a twin-screw extruder.

Measurement of original state properties, evaluation for heat aging resistance, a fuel oil resistance test, and a compression set test were performed by the method described above. Table 1 indicates results thereof.

Example 5

A cross-linkable nitrile rubber composition was prepared in a similar manner to Example 1 except that 2.4 parts of 2,2-bis{4-(4-aminophenoxy) phenyl} propane (manufactured by Wakayama Seika Kogyo Co., Ltd., polyamine cross-linking agent) (hereinafter also referred to as "BAPP") was used in place of hexamethylenediamine carbamate in obtaining the cross-linkable nitrile rubber composition.

Measurement of original state properties, evaluation for heat aging resistance, a fuel oil resistance test, and a compression set test were performed by the method described above. Table 1 indicates results thereof.

Comparative Example 1

A highly saturated nitrile rubber composition was obtained by kneading 20 parts of the carboxyl group-containing highly saturated nitrile rubber (a-1) obtained in Synthesis Example 1, 50 parts of the highly saturated nitrile rubber (a'-3), and 30 parts of nylon 66 (trade name "Amilan CM3006", manufactured by Toray Industries. Inc., polyamide resin) using a twin-screw extruder at 280° C.

Further, a cross-linkable nitrile rubber composition was prepared in a similar manner to Example 1 except that the highly saturated nitrile rubber composition obtained in the above was used and that 7 parts of a 1,3-bis(t-butylperoxy isopropyl) benzene 40% product (trade name "Vul Cup40KE", manufactured by Arkema Co., Ltd., organic peroxide cross-linking agent) was used in place of DBU and hexamethylenediamine carbamate in obtaining the cross-linkable nitrile rubber composition.

Measurement of original state properties, evaluation for heat aging resistance, a fuel oil resistance test, and a compression set test were performed by the method described above. Table 1 indicates results thereof.

Comparative Example 2

A highly saturated nitrile rubber composition and a cross-linkable nitrile rubber composition were prepared in a similar manner to Example 1 except that kneading was performed using a roll kneader at 100° C. in place of kneading using a twin-screw extruder at 280° C. in obtaining the highly saturated nitrile rubber composition.

Measurement of original state properties, evaluation for heat aging resistance, a fuel oil resistance test, and a compression set test were performed by the method described above. Table 1 indicates results thereof.

Comparative Example 3

A highly saturated nitrile rubber composition and a cross-linkable nitrile rubber composition were prepared in a similar manner to Example 1 except that kneading was performed using a Banbury mixer at 200° C. in place of kneading using a twin-screw extruder at 280° C. in obtaining the highly saturated nitrile rubber composition.

Measurement of original state properties, evaluation for heat aging resistance, a fuel oil resistance test, and a compression set test were performed by the method described above. Table 1 indicates results thereof.

TABLE 1

| | | | Example | | | | | Comparative Example | | |
|---|---|---|---|---|---|---|---|---|---|---|
| | | | 1 | 2 | 3 | 4 | 5 | 1 | 2 | 3 |
| Highly saturated nitrile rubber composition | Composition (part) | Synthesis Example 1 (a-1) AN-BD-MBM copolymer | 75 | 75 | — | 70 | 70 | 20 | 70 | 70 |
| | | Synthesis Example 2 (a-2) AN-BD-MBM copolymer | — | — | 70 | — | — | — | — | — |
| | | Synthesis Example 3 (a'-3) AN-BD copolymer | — | — | — | — | — | 50 | — | — |
| | | Polyamide resin, nylon 66 | 30 | 25 | 30 | — | 30 | 30 | 30 | 30 |
| | | Polyester resin, polybutylene terephthalate | — | — | — | 30 | — | — | — | — |
| | Kneading condition | Kneader | Twin-screw extruder | Twin-screw extruder | Twin-screw extruder | Twin-screw extruder | Twin-screw extruder | Twin-screw extruder | Roll kneader | Banbury mixer |
| | | Kneading temperature (° C.) | 280 | 280 | 280 | 235 | 280 | 280 | 100 | 200 |
| Cross-linkable nitrile rubber composition | Composition (part) | Polymer | 100 | 100 | 100 | 100 | 100 | 100 | 100 | 100 |
| | | FEF carbon black | 20 | 20 | 20 | 20 | 20 | 20 | 20 | 20 |
| | | Stearic acid | 1 | 1 | 1 | 1 | 1 | 1 | 1 | 1 |
| | | 4,4'-di-(α-α-dimethylbenzyl) diphenylamine | 1.5 | 1.5 | 1.5 | 1.5 | 1.5 | 1.5 | 1.5 | 1.5 |
| | | DMI (60% product) | 3 | 3 | 3 | 3 | 3 | — | 3 | 3 |
| | | Hexamethylenediamine carbamate | 1.8 | 2 | 1.8 | 1.8 | — | — | 1.8 | 1.8 |
| | | BAPP | — | — | — | — | 2.4 | — | — | — |
| | | 1,3-bis(t-butylperoxy Isopropyl) benzene (40% product) | — | — | — | — | — | 7 | — | — |
| Evaluation for cross-linked rubber product | Original state properties | Tensile strength (MPa) | 31.1 | 27.5 | 30.8 | 28.3 | 27.5 | 28.9 | 23.1 | 22.7 |
| | | Elongation at break (%) | 200 | 220 | 200 | 130 | 230 | 260 | 70 | 70 |
| | | 100 tensile stress (MPa) | 17.4 | 15.5 | 17.2 | 23.6 | 13.4 | 15.6 | — | — |
| | Heat aging resistance | Elongation change ratio (%) | −2 | −2 | −2 | −2 | −2 | −6 | −5 | −5 |
| | Fuel oil resistance | Volume change ratio (%) | 38 | 39 | 39 | 39 | 39 | 38 | 38 | 38 |
| | Compression set test | Compression set (%) | 45 | 43 | 45 | 50 | 52 | 82 | 72 | 74 |

As indicated in Table 1, when a cross-linkable nitrile rubber composition containing the carboxyl group-containing highly saturated nitrile rubber (A), the resin (B), and the polyamine cross-linking agent (C), obtained by blending the carboxyl group-containing highly saturated nitrile rubber (A) at a ratio specified in the present invention and performing kneading at a temperature equal to or higher than the melting point of the resin (B) was used, a cross-linked rubber product obtained therefrom had excellent compression set resistance, excellent heat aging resistance and excellent fuel oil resistance, and highly balanced tensile strength, elongation, and 100% tensile stress (Examples 1 to 5).

Meanwhile, when the blending amount of the carboxyl group-containing highly saturated nitrile rubber (A) was too small, compression set resistance of an obtained cross-linked rubber product was poor (Comparative Example 1).

Further, when the carboxyl group-containing highly saturated nitrile rubber (A) was blended at a ratio specified in the present invention but the carboxyl group-containing highly saturated nitrile rubber (A) and the resin (B) were kneaded at a temperature lower than the melting point of the resin (B), an obtained cross-linked rubber product had poor tensile strength and elongation (Comparative Examples 2 and 3).

The invention claimed is:

1. A cross-linkable nitrile rubber composition comprising a carboxyl group-containing highly saturated nitrile rubber obtained by copolymerizing α,β-ethylenically unsaturated dicarboxylic acid monoester monomer, at least one resin selected from the group consisting of a polyester resin and a polyamide resin, and a polyamine cross-linking agent, wherein the content of the carboxyl group-containing highly saturated nitrile rubber is 30 parts by weight or more and 95 parts by weight or less with respect to 100 parts by weight of the total amount of the carboxyl group-containing highly saturated nitrile rubber and the resin, and the cross-linkable nitrile rubber composition is obtained by performing kneading at a temperature equal to or higher than a melting point of the resin.

2. The cross-linkable nitrile rubber composition according to claim 1, wherein the content of the carboxyl group-containing highly saturated nitrile rubber is 60 parts by weight or more and 95 parts by weight or less with respect to 100 parts by weight of the total amount of the carboxyl group-containing highly saturated nitrile rubber and the resin.

3. The cross-linkable nitrile rubber composition according to claim 1, wherein the resin is the polyamide resin.

4. A cross-linked rubber product obtained by cross-linking the cross-linkable nitrile rubber composition according to claim 2.

5. The cross-linked rubber product according to claim 4, wherein the cross-linked rubber product has 100% tensile stress of 10 MPa or more.

6. A method for manufacturing a cross-linkable nitrile rubber composition containing a carboxyl group-containing highly saturated nitrile rubber obtained by copolymerizing α,β-ethylenically unsaturated dicarboxylic acid monoester monomer, at least one resin selected from the group consisting of a polyester resin and a polyamide resin, and a polyamine cross-linking agent, the method comprising:

a kneading step of kneading at a temperature equal to or higher than a melting point of the resin, wherein the content of the carboxyl group-containing highly saturated nitrile rubber is 30 parts by weight or more and 95 parts by weight or less with respect to 100 parts by weight of the total amount of the carboxyl group-containing highly saturated nitrile rubber and the resin.

7. The method for manufacturing a cross-linkable nitrile rubber composition according to claim 6, wherein a twin-screw extruder is used for kneading in the kneading step.

* * * * *